J. E. EMERSON.
Saw-Teeth.
No. 138,236. Patented April 29, 1873.
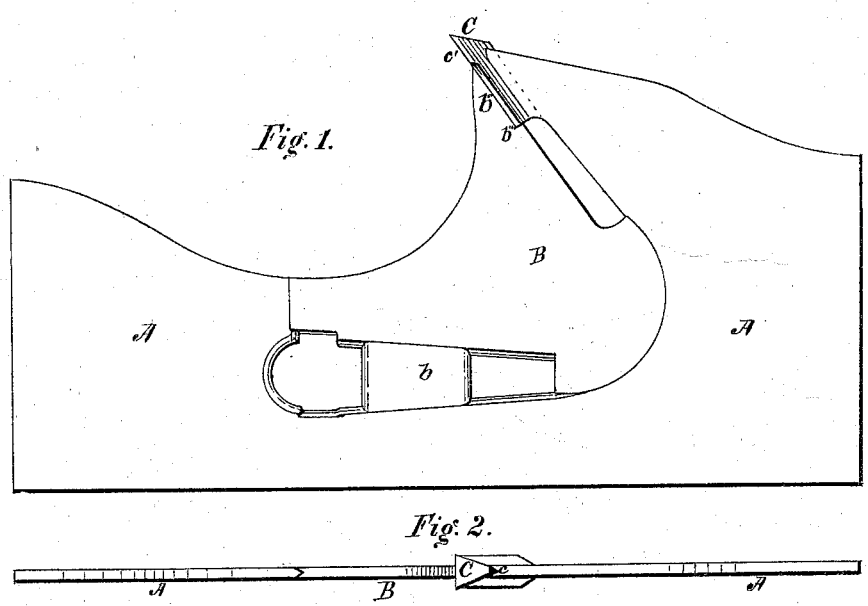

UNITED STATES PATENT OFFICE.

JAMES E. EMERSON, OF BEAVER FALLS, PENNSYLVANIA.

IMPROVEMENT IN SAW-TEETH.

Specification forming part of Letters Patent No. 138,236, dated April 29, 1873; application filed January 24, 1873.

*To all whom it may concern:*

Be it known that I, JAMES E. EMERSON, of Beaver Falls, in the county of Beaver, in the State of Pennsylvania, have made certain Improvements in Saw-Teeth, of which the following is a specification:

This invention relates to saws having removable teeth; the object being to obviate what has heretofore been an obstacle in the general use of saws with removable teeth—to wit, the expense of the removable teeth; and it consists of the teeth as an article of manufacture.

In the drawing, Figure 1 is a side view of a section of a saw-plate with a tooth in position. Fig. 2 is an edge view of the same.

A represents a section of a saw-plate with the clamp-piece or tooth-holder B that holds the tooth in place by the wedge $b$, as seen in former patents granted to me. C is the tooth, held in place by the clamp-holder B, as seen in Fig. 1. This tooth is made from a triangular bar of steel, such as the three-cornered file-blanks are made from, cut to the short length seen in Fig. 1, and its shank is clamped between the holder and saw-blade, while that part of the tooth which projects beyond the saw-blade is left the full width of the blank, and the inner end of the shank abuts against a shoulder, $b'''$, on the clamp-piece B, which prevents the tooth C from being forced inwardly in the action of the sawing, while the angular shape of the back of the tooth fits into an angular groove, $c$, in the saw-plate A, which prevents any lateral movement of the tooth when clamped in place between the clamp-piece B and saw-plate A.

A saw-tooth formed as above described is cheap, durable, and easily inserted and held in the saw-plates, and is calculated never to be sharpened at all, or at least only once or twice, as the cost of them by the hundred, tempered and sharpened for work, will not exceed the sum of one dollar; consequently, when removed from the saw-plate for sharpening, the grinding by ordinary means would cost more than a new tooth; hence, as a matter of economy, they would never be sharpened after becoming once dulled, except when new teeth are not ready at hand.

The sharp angular edges at $c'$ that project equally beyond each side of the saw-plate act as a planing-edge to cut or plane the sides of the saw-kerf smooth, thus not only producing a cheap, easily-inserted, and firmly-held tooth, but a tooth having the sharp planing-edges to plane the sides of the saw-kerf as well.

To form a tooth from a blank cut from a bar of triangular steel of the proper length, a single blow of a drop-hammer, forcing the tangs of the teeth into proper dies, is all that is required to give them the form necessary to be sharpened and used, as herein described, while the complete sharpening is done by a machine for grinding them so that every one will have the same shape and length and the same width and cutting-edge.

By this mode of producing saw-teeth another great difficulty is effectually overcome and obviated, which is, that the saw-teeth, as generally tempered for sharpening with a file, are too soft to stand in hard wood or knots in any wood, and are constantly having their points bent or worn off by the action of cutting wood; but, by constructing the teeth and sharpening them as above described, the teeth can have as hard or high temper as is safe before breaking in cutting away the wood in sawing; hence, the cutting-edges of these hard teeth will do very much more work before a second sharpening or removal of the teeth becomes necessary.

Having thus described my invention, what I claim, and desire to secure by Letters Patent, is—

The removable saw-tooth C as a new article of manufacture.

JAMES E. EMERSON.

Witnesses:
 WM. H. BURBANK,
 GEO. A. CHAMBERS.